(12) United States Patent
Chen et al.

(10) Patent No.: US 12,077,466 B2
(45) Date of Patent: Sep. 3, 2024

(54) PARTICLE EXHAUST APPARATUS FOR OPTICAL FIBER DRAW FURNACE

(71) Applicant: CORNING INCORPORATED, Corning, NY (US)

(72) Inventors: Guoqiang Chen, Shanghai (CN); Zhi Ming Liu, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 154 days.

(21) Appl. No.: 17/238,253

(22) Filed: Apr. 23, 2021

(65) Prior Publication Data

US 2021/0331963 A1   Oct. 28, 2021

Related U.S. Application Data

(60) Provisional application No. 63/014,793, filed on Apr. 24, 2020.

(51) Int. Cl.
   *C03B 37/029*   (2006.01)
   *C03B 37/03*   (2006.01)

(52) U.S. Cl.
   CPC .......... *C03B 37/029* (2013.01); *C03B 37/032* (2013.01); *C03B 2205/61* (2013.01); *C03B 2205/72* (2013.01)

(58) Field of Classification Search
   None
   See application file for complete search history.

(56) References Cited

U.S. PATENT DOCUMENTS

| 4,988,374 A | 1/1991 | Harding et al. |
| 5,284,499 A * | 2/1994 | Harvey ................. C03B 37/029 65/435 |
| 6,928,840 B1 * | 8/2005 | Nagayama ............ C03B 37/029 65/435 |
| 2002/0059816 A1 * | 5/2002 | Nagayama ........ C03B 37/02718 65/435 |
| 2013/0098116 A1 | 4/2013 | Endo |
| 2017/0101336 A1 | 4/2017 | Carlton et al. |
| 2019/0241459 A1 | 8/2019 | Carlton et al. |

(Continued)

FOREIGN PATENT DOCUMENTS

| CN | 106424071 A | 2/2017 |
| EP | 1428802 A2 | 6/2004 |
| JP | 08-119661 A | 5/1996 |

(Continued)

OTHER PUBLICATIONS

JP2004-250286A Machine Translation Retrieved Dec. 9, 2022. (Year: 2022).*

(Continued)

*Primary Examiner* — Lisa L Herring
(74) *Attorney, Agent, or Firm* — Yiqun Zhao

(57) ABSTRACT

According to one embodiment of the present disclosure, a reclaim cylinder includes: a single housing (60) coupled to a fiber draw furnace system, the housing defining a reclaim chamber 64, a plurality of gas reclaim ports (68) spaced equidistant from each other and tangentially coupled to the housing, a gas sampling port (52) tangentially or perpendicularly coupled to the housing, and a particle sampling port (54) tangentially or perpendicularly coupled to the housing.

17 Claims, 8 Drawing Sheets

(56) References Cited

U.S. PATENT DOCUMENTS

2019/0284085 A1    9/2019   Kladias et al.

FOREIGN PATENT DOCUMENTS

| | | | | |
|---|---|---|---|---|
| JP | 2004250286 A | * | 9/2004 | ........... C03B 37/029 |
| JP | 2018-193262 A | | 12/2018 | |
| WO | 2018/209720 A1 | | 11/2018 | |
| WO | 2019/177948 A1 | | 9/2019 | |

OTHER PUBLICATIONS

European Patent Application No. 21169972.3, European Search Report dated Jul. 28, 2021; 3 pages; European Patent Office.
International Search Report and Written Opinion of the International Searching Authority; PCT/US2021/028319; dated Aug. 6, 2021; 12 pages; European Patent Office.

* cited by examiner

PARTICLE EXHAUST APPARATUS FOR OPTICAL FIBER DRAW FURNACE

CROSS-REFERENCE TO RELATED APPLICATIONS

This application claims the benefit of priority under 35 U.S.C. § 119 of U.S. Provisional Application Ser. No. 63/014,793 filed on Apr. 24, 2020, the content of which is relied upon and incorporated herein by reference in its entirety.

FIELD

The present disclosure generally relates to a fiber draw furnace, and more specifically, to a method and system for reclaiming gas in the fiber draw furnace.

BACKGROUND

Helium gas is used in various stages of conventional fiber manufacturing processes. For some manufacturing processes, a large fraction of the consumption of helium is in a fiber draw furnace where active purging of the furnace with an inert gas is required to prevent air entrainment and oxidation of the hot components of the furnace. Helium is a nonrenewable resource recovered as a byproduct from natural gas wells. As the price of helium is projected to increase in the future, and supply shortages disrupt fiber production, removing and/or reusing helium from the fiber draw furnace may be advantageous. In addition, draw furnace particles are identified as major fiber break source in optical fiber making process, typically particles generated inside a draw furnace come from two parts which can impinge running fiber, causing bare fiber surface crack, and then break the fiber when the crack depth is over the critical break size under certain tension. The two major types of surface particles are residual particles on the muffle surface and aerosol suspension particles within the furnace gas flow. Accordingly, there is a need to provide methods and apparatuses that will allow reclamation of helium from the fiber draw furnace and reduce or eliminate particle accumulation within the furnace.

SUMMARY

According to a first embodiment of the present disclosure, a reclaim cylinder, includes: a single housing (60) coupled to a fiber draw furnace system, the housing defining a reclaim chamber 64, a plurality of gas reclaim ports (68) spaced equidistant from each other and tangentially coupled to the housing, a gas sampling port (52) tangentially or perpendicularly coupled to the outer housing, and a particle sampling port (54) tangentially or perpendicularly coupled to the outer housing.

According to a second embodiment of the present disclosure, the reclaim cylinder of the first embodiment, the fiber draw furnace system comprises: a heated section (22) having a first end (22A) and a second end (22B), wherein the heated section is configured to hold an optical fiber preform (38); an upper gas inlet (14) coupled to the first end of the heated section, wherein the upper gas inlet is configured to flow a first gas into the heated section; a lower extended muffle (30) having a first end (30A) and a second end (30B); a lower gas inlet (34) coupled to the second end of the lower extended muffle configured to allow a gas to flow into the lower extended muffle; and wherein the reclaim cylinder (26) is coupled to the lower extended muffle between the first end of the lower extended muffle and the second end of the heated section.

According to a third embodiment of the present disclosure, the reclaim cylinder of the first and second embodiment, wherein the housing of the reclaim cylinder defines a first end coupled to the heated section and a second end coupled to the first end of the lower extended muffle According to a fourth embodiment of the present disclosure, the reclaim cylinder of the third embodiment, wherein the plurality of gas reclaim ports are closer to the second end of the housing than the first end of the housing.

According to a fifth embodiment of the present disclosure, the reclaim cylinder of the third embodiment, wherein the gas sampling port and the particle sampling port are closer to the first end of the housing than the second end of the housing.

According to a sixth embodiment of the present disclosure, the reclaim cylinder of the first through fifth embodiment, wherein the gas sampling port and the particle sampling port are positioned along a length of the housing at the same height relative to each other.

According to a seventh embodiment of the present disclosure, the reclaim cylinder of the first through fifth embodiment, wherein the gas sampling port and the particle sampling port are positioned along a length of the housing at a 90 degree offset from each other According to an eighth embodiment of the present disclosure, the reclaim cylinder of the first through seventh embodiment, wherein an internal diameter of the housing is about 4.2 cm to about 7.8 cm.

According to a ninth embodiment of the present disclosure, the reclaim cylinder of the first through seventh embodiment, wherein an external diameter of the housing is about 4.4 cm to about 7.8 cm.

According to a tenth embodiment of the present disclosure, the reclaim cylinder of the first through ninth embodiment, further comprising: a tube extending from the second end of the lower extended muffle toward the first end that is substantially coaxial with the lower extended muffle.

According to an eleventh embodiment of the present disclosure, the reclaim cylinder of the tenth embodiment, wherein the tube extends from a lower extended muffle outlet.

According to a twelfth embodiment of the present disclosure, the reclaim cylinder of the first through eleventh embodiment, wherein the plurality of gas reclaim ports are configured to generate a gas vortex within the reclaim chamber.

According to a thirteenth embodiment of the present disclosure, the reclaim cylinder of the first through twelfth embodiment, wherein the plurality of gas reclaim ports are configured to remove a portion of the first gas from the reclaim chamber.

According to a fourteenth embodiment of the present disclosure, the reclaim cylinder of the first through thirteenth embodiment, wherein the lower gas inlet is configured to pass the second gas at a rate configured to substantially recover a pressure drop associated with removing the portion of the first gas.

According to a fifteenth embodiment of the present disclosure, a method of producing an optical fiber, includes the steps of: flowing a first gas into an optical fiber draw furnace; passing the first gas through a heated section of the optical fiber draw furnace; passing the first gas into a reclaim cylinder coupled to the of the optical fiber draw furnace, the reclaim cylinder comprising: a housing (60) defining a reclaim chamber 64, a plurality of gas reclaim ports (68) spaced equidistant from each other and tangentially coupled to the housing, a gas sampling port (52) tangentially or perpendicularly coupled to the outer housing, and a particle sampling port (54) tangentially or perpendicularly coupled to the outer housing; removing a portion of the first gas through the plurality of gas reclaim ports fluidly coupled to the reclaim cylinder such that a vortex of the first gas is generated in the reclaim cylinder, wherein the plurality of gas reclaim ports are spaced equidistant from each other and are tangentially coupled to the outer housing; and flowing a second gas from a gas inlet at a rate configured to substantially recover a pressure drop associated with removing the portion of the first gas.

According to a sixteenth embodiment of the present disclosure, the method of the fifteenth embodiment, wherein the optical fiber draw furnace comprises: the heated section (22) having a first end (22A) and a second end (22B), wherein the heated section is configured to hold an optical fiber preform (38); an upper gas inlet (14) coupled to the first end of the heated section, wherein the upper gas inlet is configured to flow a first gas into the heated section;

a lower extended muffle (30) having a first end (30A) and a second end (30B); and a lower gas inlet (34) coupled to the second end of the lower extended muffle configured to allow a gas to flow into the lower extended muffle;

According to a seventeenth embodiment of the present disclosure, the method of the sixteenth embodiment, wherein the reclaim cylinder is coupled to the lower extended muffle between the first end of the lower extended muffle and the second end of the heated section.

According to an eighteenth embodiment of the present disclosure, the method of the sixteenth embodiment, further comprising the step: passing a portion of the first gas from the reclaim cylinder into the lower extended muffle.

According to a nineteenth embodiment of the present disclosure, the method of the fifteenth through eighteenth embodiment, wherein the step of removing the portion of first gas further comprises: removing the portion of the first gas such that an axis of rotation of the vortex is parallel with an axis of the reclaim cylinder.

According to a twentieth embodiment of the present disclosure, the method of the fifteenth through nineteenth embodiment, wherein the step of flowing a first gas into an optical fiber draw furnace further comprises:

flowing the first gas comprising helium into the optical fiber draw furnace.

According to a twenty-first embodiment of the present disclosure, the method of the fifteenth through twentieth embodiment, wherein the step of flowing the second gas from the gas inlet further comprises: flowing the second gas comprising a gas which is inert to the optical fiber from the gas inlet.

According to a twenty-second embodiment of the present disclosure, the method of the sixteenth through twenty-first embodiment, wherein the housing of the reclaim cylinder defines a first end coupled to the heated section and a second end coupled to the first end of the lower extended muffle According to a twenty-third embodiment of the present disclosure, the method of the twenty-second embodiment, wherein the plurality of gas reclaim ports are closer to the second end of the housing than the first end of the housing.

According to a twenty-fourth embodiment of the present disclosure, the method of the twenty-second embodiment, wherein the gas sampling port and the particle sampling port are closer to the first end of the housing than the second end of the housing.

According to a twenty-fifth embodiment of the present disclosure, the method of the fifteenth through the twenty-fourth embodiment, wherein the gas sampling port and the particle sampling port are positioned along a length of the housing at the same height relative to each other.

According to a twenty-sixth embodiment of the present disclosure, the method of the fifteenth through the twenty-fifth embodiment, wherein the gas sampling port and the particle sampling port are positioned along a length of the housing at a 90 degree offset from each other According to a twenty-seventh embodiment of the present disclosure, the method of the fifteenth through the twenty-sixth embodiment, wherein an internal diameter of the housing is about 4.2 cm to about 7.8 cm.

According to a twenty-eighth embodiment of the present disclosure, the method of the fifteenth through the twenty-seventh embodiment, wherein an external diameter of the housing is about 4.4 cm to about 7.8 cm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
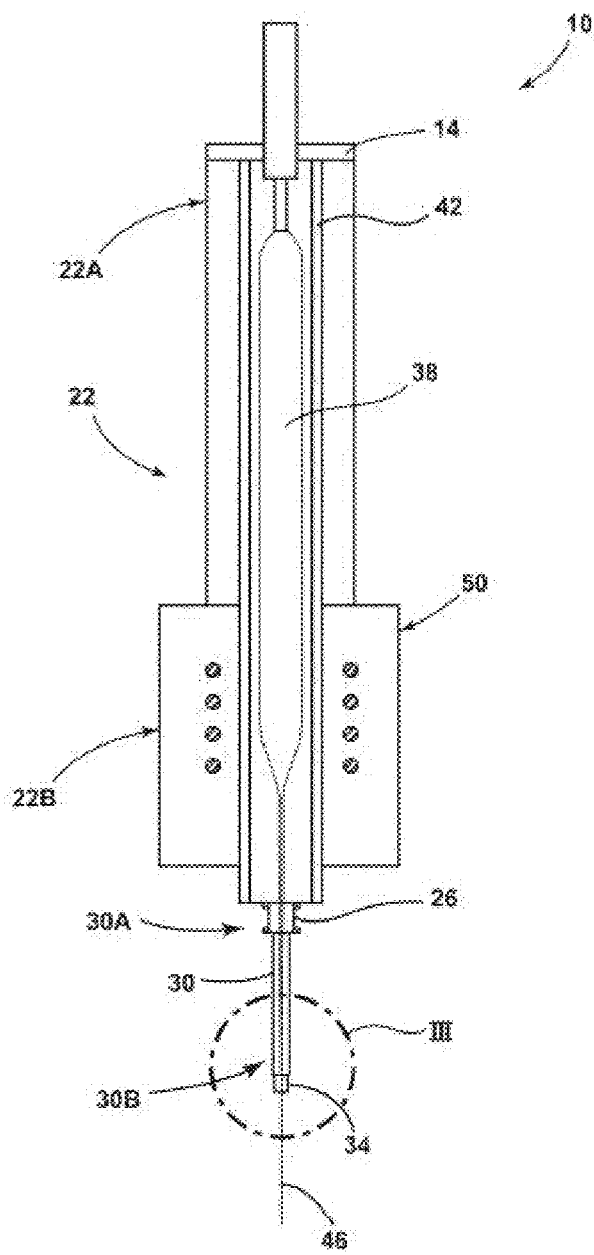
FIG. 1 is cross-sectional view of an optical fiber draw furnace, according to one embodiment.

Reference will now be made in detail to the present preferred embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivates thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, embodiments depicted in the figures may not be to scale or may incorporate features of more than one embodiment.

Referring to FIG. 1, a fiber draw furnace 10 is generally shown. The fiber draw furnace 10 includes an upper gas inlet 14, a heated section 22, a reclaim cylinder 26, a lower extended muffle 30, and a bottom gas inlet 34.

The heated section 22 may have a first end 22A and a second end 22B. The first end 22A of the heated section 22 may generally be the top and the second end 22B may generally be the bottom of the heated section 22.

The lower extended muffle 30 may have a first end 30A and a second end 30B. The first end 30A of the lower extended muffle 30 may generally be the top of the lower extended muffle 30 and the second end 30B may generally be the bottom of the lower extended muffle 30.

An optical fiber preform 38 and a muffle 42 are positioned within the heated section 22. The optical fiber preform 38 may be constructed of any glass or material and may be doped suitable for the manufacture of an optical fiber 46. In some embodiments, the optical fiber preform 38 may include a core and a cladding. In some embodiments, the optical fiber preform 38 may be heated such that the viscosity of the optical fiber preform 38 is lowered and the optical fiber 46 is drawn therefrom. The optical fiber 46 is drawn from the optical fiber preform 38 out through the reclaim cylinder 26, through the lower extended muffle 30 and out a bottom of the fiber draw furnace 10 and may be wound onto a spool.

The upper gas inlet 14 is positioned within or coupled to an upper portion of the heated section 22. The upper gas inlet 14 is configured to inject, release or otherwise flow a first gas into the heated section 22. The upper gas inlet 14 may be a single inlet port, a plurality of inlet ports and/or a continuous or semi-continuous opening configured to inject the first gas into the heated section 22. It will be understood that the upper gas inlet 14 may include one or more gratings or screens configured to modify flow characteristics of the first gas. The first gas may travel into the heated section 22, around the optical fiber preform 38 and into the reclaim cylinder 26.

The first gas may include one or more gases which are inert to the heated section 22, the optical fiber preform 38 and/or other components of the fiber draw furnace 10. For example, the first gas may include helium, argon, nitrogen, and/or other inert gases. In some embodiments, the first gas includes helium. Inert examples of the first gas may be advantageous in preventing oxidation and/or damage from occurring to components of the fiber draw furnace 10. The upper gas inlet 14 may inject the first gas at a rate of between about 5 standard liters per minute (SLPM) and about 100 SLPM. In specific examples, the upper gas inlet 14 may inject the first gas at a flow rate of about 15 SLMP, 16 SLPM, 17 SLPM, 18 SLPM, 19 SLPM, 20 SLPM, 21 SLPM, 22 SLPM, 23 SLPM, 24 SLPM, 30 SLPM, 40 SLPM, 50 SLPM, 60 SLPM, 70 SLPM, 80 SLPM, 90 SLPM or any value or range between these values.

A heater 50 is thermally coupled to the muffle 42 of the heated section 22 and is configured to create a hot zone within the heated section 22 of the fiber draw furnace 10. Specifically, the hot zone may have a temperature of from about 1800° C. to about 2000° C. For example, the hot zone may have a temperature of about 1700° C., 1800° C., 1900° C., or about 2000° C., or any value or range between these values. The heat of the hot zone in the heated section 22 is configured to lower the viscosity of the optical fiber preform 38 such that the optical fiber 46 is drawn therefrom. The optical fiber 46 may be drawn from the optical fiber preform 38 at a rate of between about 30 m/s and about 60 m/s, or between about 40 m/s and about 50 m/s. In a specific example, the optical fiber 46 may be drawn from the fiber preform 38 at a rate of about 50 m/s.

The muffle 42 is positioned within the heated section 22 around the optical fiber preform 38. The muffle 42 and/or lower extended muffle 30 may be composed of a refractory material such as graphite, zirconia, binders and/or combinations thereof. The muffle 42 and lower extended muffle 30 may be configured to retain heat within the fiber draw furnace 10 as well as protect other components from excess temperatures. Although the materials of the muffle 42 and/or lower extended muffle 30 may generally be good insulators, oxidation may occur at elevated temperatures. As such, the first gas may be inserted or injected into the fiber draw furnace 10 to prevent oxidation of the muffle 42 and/or lower extended muffle 30. The muffle 42 and/or the lower extended muffle 30 may have a substantially uniform inner diameter, or the inner diameter may be varied throughout.

As explained above, while graphite offers superior thermal resistance properties, oxidation of a graphite muffle 42 may also increase the likelihood of draw induced point defects ("DIPDs") being generated on the optical fiber 46. Oxidation occurs when gases from the ambient atmosphere (e.g., oxygen-containing compounds) and/or impurities within the first gas react with the graphite of the muffle 42 at high temperature according to equations (1) and (2):

$$C + O_2 \rightarrow CO_2 \qquad (1)$$

$$C + CO_2 \rightarrow 2CO \qquad (2)$$

Additionally or alternatively, silica particles (e.g., from the optical fiber preform 38) can oxidize carbon based materials based on reaction (3):

$$C + SiO_2 \rightarrow SiC + 2CO \qquad (3)$$

These reactions at the muffle 42 with oxygen, silicon dioxide and oxygen-containing gases may cause the muffle 42 to be consumed, especially at elevated drawing temperatures for the optical fiber 46.

In graphite examples of the muffle 42, the graphite material of the muffle 42 is a composite of graphite grains bonded together by a carbon binder matrix. The binder material is more susceptible to oxidation than the graphite grains. Therefore, when the composite of the two materials is exposed to oxygen-containing compounds at high temperatures, the matrix binder material preferentially oxidizes. The graphite grains, having no binder left to hold them in place, are then free to fall away from the muffle 42. Without being bound by theory, it is believed that this mechanism causes graphite particulates to migrate from the muffle 42 to the optical fiber 46 during drawing thereby inducing draw induced point defects (DIPDs). DIPDs manifest themselves as sharp attenuation increases in the signal transmitted through the optical fiber 46. The larger the graphite particulate, the greater the chance of the DIPD being formed on the optical fiber 46.

Without being bound by theory, it is believed that conventional furnace designs result in the collection of particles in the furnace 10. Exemplary particles that may accumulate in the furnace are carbon (C), silicon carbide (SiC), silicon oxide (SiO), silicon dioxide (SiO$_2$), or a combination thereof. Carbon particles, ranging from about 2 um to 200 um in size, can accumulate on the interior surface of the muffle (42). Silicon carbide (SiC) particles, ranging in size from about 2 um to about 5000 um, can accumulate on the wall of the heater (50) below the hot zone. Silicon oxide and silicon dioxide particles, ranging in size from about 2 um to about 120 um, can accumulate on the wall of the lower extended muffle 30. The particles agglomerate over time and grow in size. Upward moving currents of gas moving along the lower extended muffle 30 (e.g., generally moving from the second end 30B to first end 30A) may cause these agglomerated particles to break free and be carried upward. The upward motion of the agglomerated particles may allow the particles to contact the optical fiber 46 where the optical fiber 46 is still at an elevated temperature and form DIPDs. In addition to collecting and agglomerating the particles, conventional systems may promote a recirculation, or reversed flow, of gasses such as CO rather than being transported out of the fiber draw furnace 10. Such a recirculation may result in a decreased life expectancy of the muffle 42 based on equations (1), (2) and (3) listed above. In other words, the gasses which tend to deteriorate the muffle 42 may have an increased residence time within the muffle 42 due to recirculation, resulting in a decreased life expectancy of the muffle 42.

The bottom gas inlet 34 may aid in preventing the loss of the first gas to an exterior of the fiber draw furnace 10 as well as the entraining of air into the furnace 10. The bottom gas inlet 34 is positioned at the second end 30B, or bottom, of the lower extended muffle 30. The bottom gas inlet 34 is fluidly coupled with the lower extended muffle 30 such that the bottom gas inlet 34 may flow a second gas into the lower extended muffle 30. According to various examples, the bottom gas inlet 34 is configured to pass the second gas at a rate configured to substantially recover a pressure drop associated with removing the portion of the first gas by the at least one reclaim port 68. As will be explained in greater detail below, the reclaim ports 68 may create a pressure drop within the fiber draw furnace 10 when gases within the reclaim cylinder 26 are drawn in. The development of the pressure drop within the fiber draw furnace 10 may be deleterious to the reclamation of gases as well as to the production of the optical fiber 46. As the pressure drops within the fiber draw furnace 10 from the removal of gases within the reclaim cylinder 26, the air in the atmosphere (e.g., nitrogen, oxygen, carbon dioxide, etc.) proximate an outlet 30C of the lower extended muffle 30 may have a tendency to be drawn into the fiber draw furnace 10 and contaminate the atmosphere within the fiber draw furnace 10 (i.e., dilute the first gas and/or introduce gases which may aid in the formation of particles). Accordingly, the bottom gas inlet 34 is configured to input, inject or otherwise flow the second gas into the lower extended muffle 30 of the fiber draw furnace 10 at a flow rate, or amount, configured to recover the pressure drop in the furnace 10 associated with the removal of the first gas. The bottom gas inlet 34 may introduce the second gas at a flow rate of between about 1 slpm and about 40 slpm, or between about 5 slpm and about 35 slpm, or between about 10 slpm and about 30 slpm, or between about 25 slpm and about 35 slpm, or between about 28 slpm and about 33 slpm. In some examples, the bottom gas inlet 34 may introduce the second gas at a flow rate of about 8 slpm, about 9 slpm, about 10 slpm, about 11 slpm, about 12 slpm, about 29 slpm, about 30 slpm, about 31 slpm, or about 32 slpm. In other examples, the bottom gas inlet 34 may introduce the second gas at a flow rate of about 0.5 slpm, about 1 slpm, about 2 slpm, about 3 slpm, about 4 slpm, about 5 slpm, about 6 slpm, or about 7 slpm. The second gas may be an inert, or largely inert, gas such as helium, neon, argon, nitrogen and/or other inert gases. Further, the second gas may be different than or have a different composition than the first gas. For example, the second gas may include helium, nitrogen, argon, other gases inert within the fiber draw furnace 10 and/or combinations thereof.

Figure 2A:
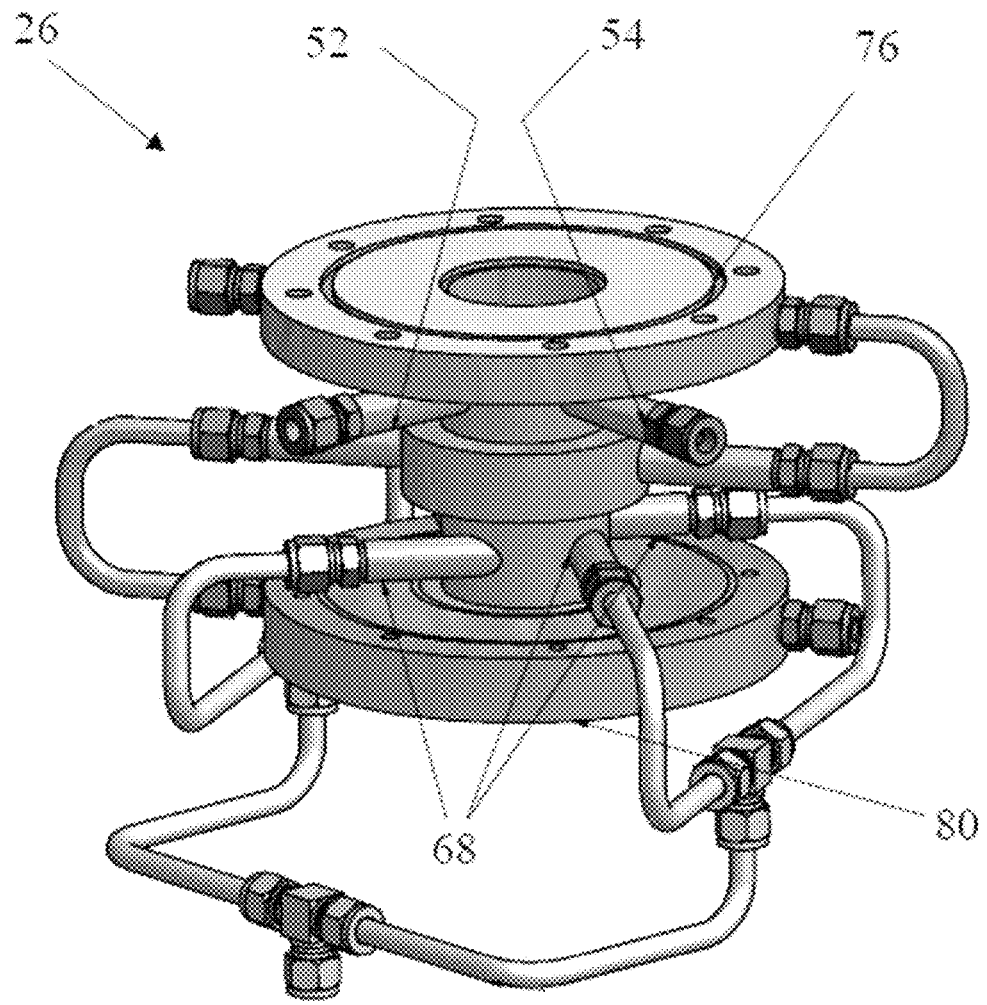
FIG. 2A is a reclaim cylinder, according to one embodiment.
Figure 2B:
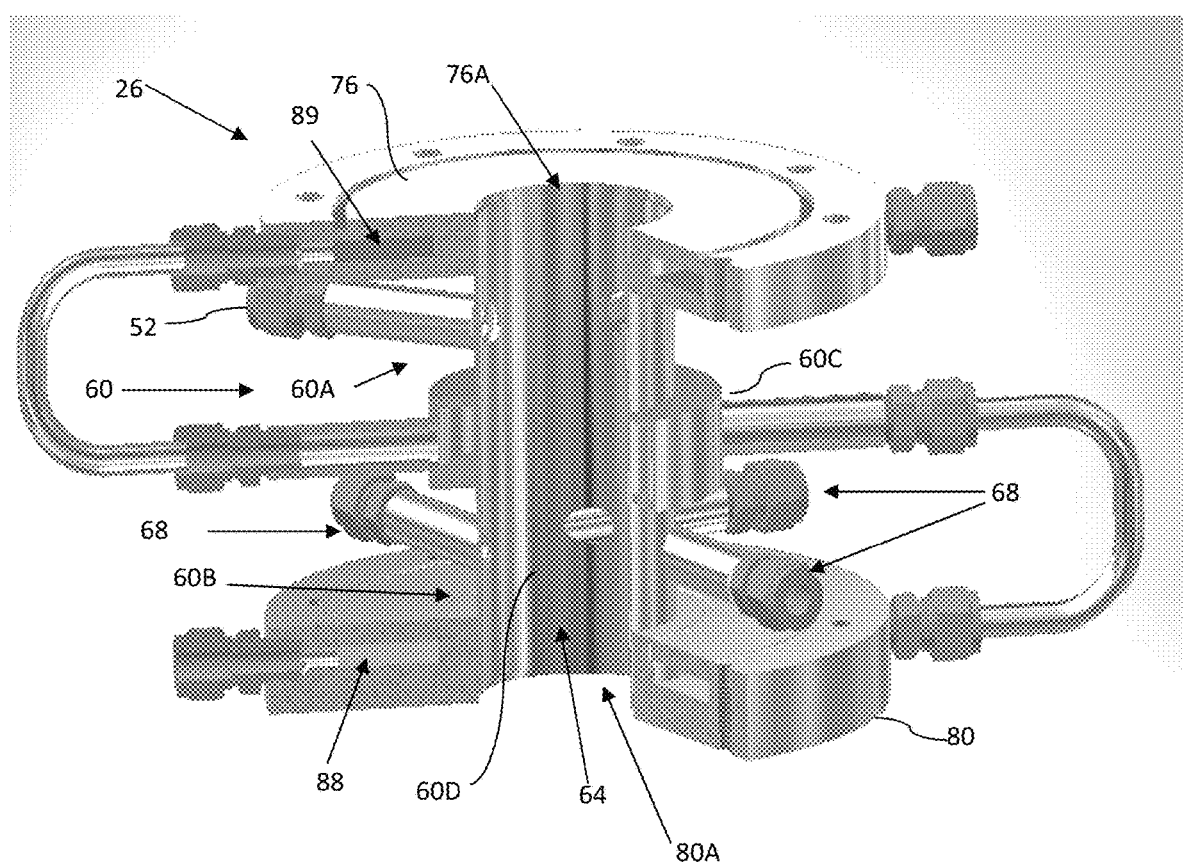
FIG. 2B is a perspective view of a reclaim cylinder, according to one embodiment.
Figure 2C:
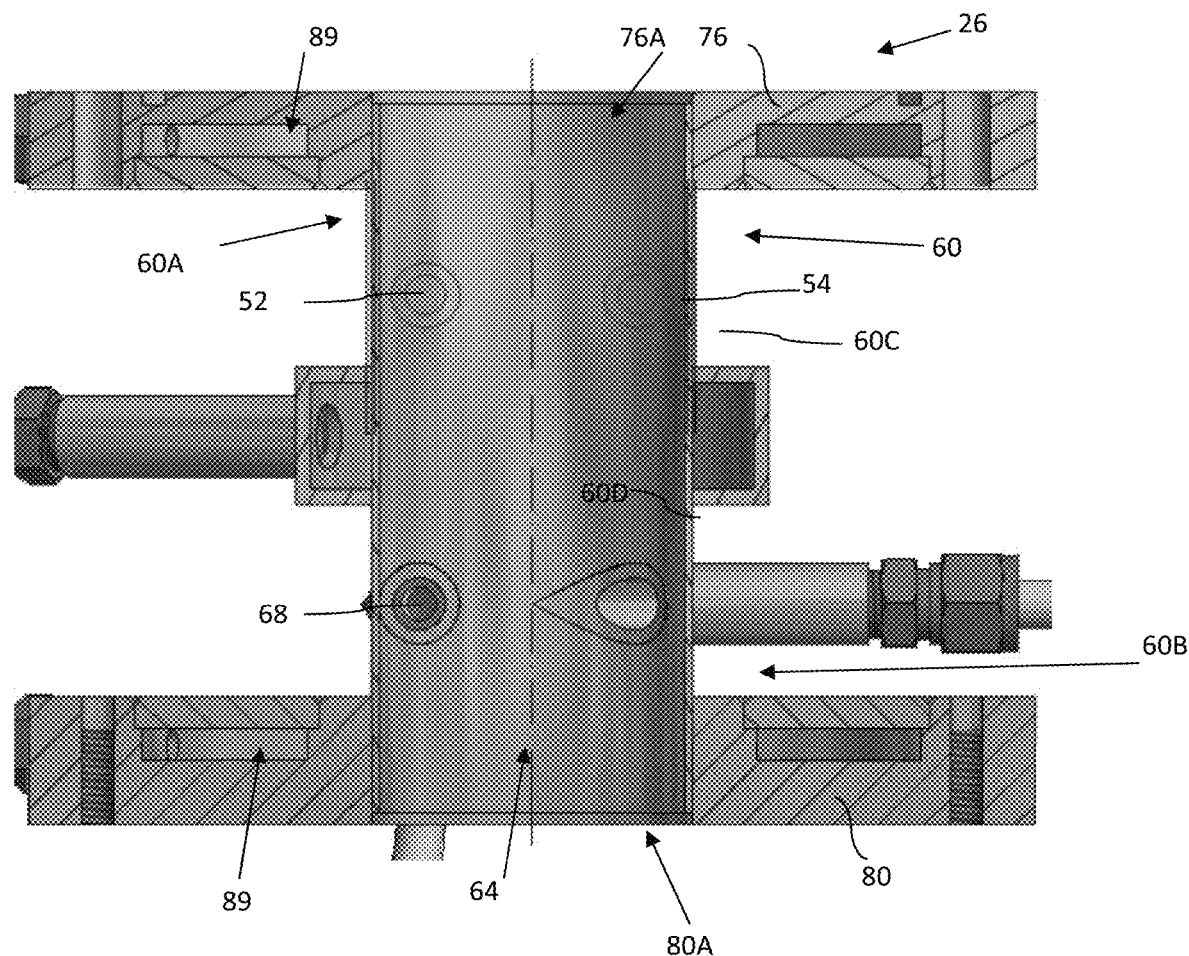
FIG. 2C is a cross sectional view of a reclaim cylinder, according to one embodiment.

Referring now to FIGS. 1 and 2, the reclaim cylinder 26 is depicted as positioned between the heated section 22 and the lower extended muffle 30, but it will be understood that other positions within the fiber draw furnace 10 are contemplated. In other words, the reclaim cylinder 26 is positioned between the second end 22B of the heated section 22 and the first end 30A of the lower extended muffle 30. As such, the reclaim cylinder 26 may be coupled to the lower extended muffle 30 and the heated section 22. The reclaim cylinder 26 includes a singular housing 60 defining a reclaim chamber 64, at least one reclaim port 68 (e.g. one reclaim port, two reclaim ports, three reclaim ports, or four reclaim ports), a CO sampling port 52, a particle sampling port 54, a top flange 76 and a bottom flange 80. It will be understood that the reclaim cylinder 26 may further include a variety of hoses and pipes fluidly coupled with the reclaim port(s) 68 and one or more mechanical fasteners which hold the reclaim cylinder 26 together.

The top flange 76 is positioned proximate a first end 60A of the housing 60 and the bottom flange 80 is positioned proximate a second end 60B of the housing 60. It will be understood that the first end 60A may generally be the top of the reclaim cylinder 26 and the second end 60B may generally be the bottom of the reclaim cylinder 26. As such, the top flange 76 couples the first end 60A of the housing 60 to the second end 22B of the heated section 22 and the bottom flange 80 couples the second end 60B of the housing 60 to the first end 30A of the lower extended muffle 30. According to various examples, the top and bottom flanges 76, 80 each define a fluid channel 89. The fluid channels 89 are configured to flow a cooling liquid there through. The cooling liquid in the fluid channels 89 may be water, oil and/or other fluids configured to remove heat from the top and bottom flanges 76, 80. Use of the fluid channels 89 within the top and bottom flanges 76, 80 may be advantageous in cooling O-rings which couple the top flange 76 to the heated section 22 and/or the lower flange 80 to the lower extended muffle 30. In such examples, the O-rings may provide a seal between the heated section 22 and the reclaim chamber 26 and the lower extended muffle 30 in the reclaim chamber 26. The top flange 76 defines a top aperture 76A and the bottom flange 80 defines a bottom aperture 80A. It will be understood that gases (e.g., the first and/or second gases) as well as the optical fiber 46 may move or pass through the top and bottom apertures 76A, 80A.

As explained above, the housing 60 includes the first end 60A and the second end 60B. The housing 60 also includes an exterior surface 60C and an interior surface 60D. The housing 60 may have a height or overall length (e.g., as measured from edges of the first and second ends 60A, 60B) of from about 7 cm to about 18 cm. In some embodiments, the housing 60 may have a length of about 12 cm, or about 12.5 cm, or about 13 cm, or about 13.5 cm, or about 14 cm, or about 14.5 cm, or about 15 cm, or about 15.5 cm, or about 16 cm, or about 16.5 cm or about 17 cm. In some embodiments, the interior surface 60D of the housing 60 may have an internal diameter 56 of about 4.2 cm to about 7.8 cm. As such, the reclaim chamber 64 may have a diameter of from about 4.2 cm to about 7.8 cm. The exterior surface 60C of the housing 60 may have an outside diameter that is the sum of the inner diameter plus the thickness (2 mm) of housing. In some embodiments, the outer diameter is about 4.4 cm to about 8.0 cm. According to various examples, the diameter of the reclaim chamber 64 is similar to an internal diameter of the muffle 42 (i.e., the heated section 22) and/or the lower extended muffle 30. For example, a cross-sectional area of the reclaim chamber 64, as measured in a plane perpendicular to a centerline axis of the muffle 42 and/or the lower extended muffle 30, may be about 10% or greater, about 20% or greater, about 30% or greater than a cross-sectional area of the muffle 42 and/or lower extended muffle 30. It will be understood that the diameter of the reclaim chamber 64 may vary over the length of the reclaim chamber 64. Further, in some examples only an inlet area of the reclaim chamber 64, where the inlet area is a space proximate the top flange 76, may exhibit a difference in cross-sectional area than the muffle 42. As will be explained in greater detail below, the greater cross-sectional area of the reclaim chamber 64 relative to the muffle 42 and/or lower extended muffle 30 may be advantageous in slowing the speed of the first gas as it passes from the heated section 22 into the reclaim cylinder 26. It will be understood that in examples where the second gas enters the reclaim cylinder 26, the speed of the second gas may also be slowed.

According to various examples, the reclaim port(s) 68, the gas sampling port 52, and the particle sampling port 54 are coupled with the housing 60 of the reclaim cylinder 26. The reclaim cylinder 26 may include one reclaim port 68 or may include a plurality of reclaim ports 68. For example, if the reclaim cylinder 26 includes a plurality of reclaim ports 68, the reclaim cylinder 26 may include two, three, or four reclaim ports 68. In operation, the reclaim ports 68 function as connections for a vacuum to draw, reclaim, suck, or otherwise remove gases (e.g., the first and/or second gases) present within the reclaim chamber 64. Such a removing of gases may be generally referred to as a capture stream.

Figure 6A:
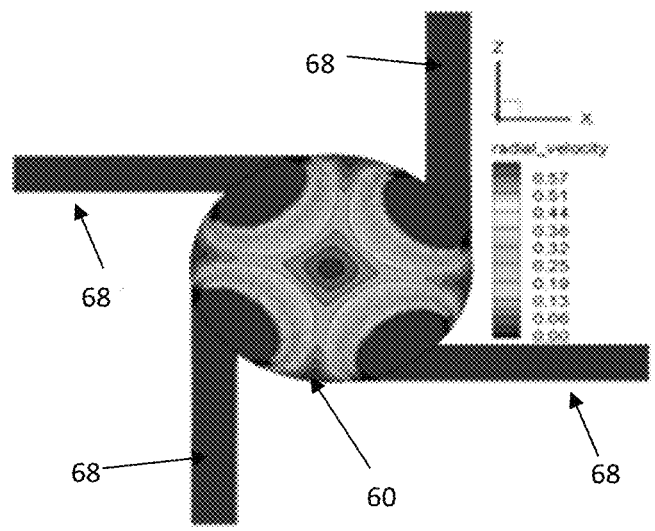
FIG. 6A-6B is a radial velocity distribution of a reclaim cylinder, according to one embodiment.
Figure 6B:
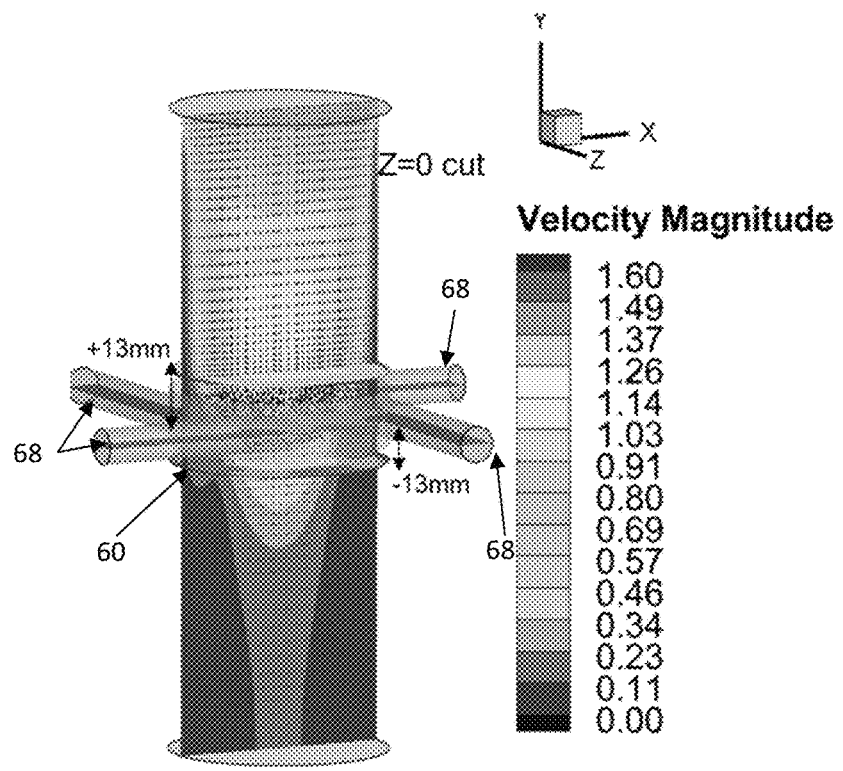

The reclaim ports 68, the gas sampling port 52, and the particle sampling port 54 may be coupled to and/or integrally formed by the housing 60. For example, portions of the reclaim ports 68, the gas sampling port 52, and the particle sampling port 54 may be defined by the housing 60 and other components may be coupled (e.g., mechanically) thereto. According to various examples, the plurality of reclaim ports 68, the gas sampling port 52, and the particle sampling port 54 are tangentially coupled or oriented to the exterior surface 60C of the housing 60. For purposes of this disclosure, the term "tangentially coupled" means that a centerline of each of the reclaim ports 68, the gas sampling port 52, and the particle sampling port 54 intersect the exterior surface 60C and/or interior surface 60D of the housing 60 at an angle of about 45° or less. For example, the centerlines of the plurality of reclaim ports 68 may form an angle with the exterior surface 60C of the housing at about 45° or less, or about 40° or less, or about 35° or less, or about 30° or less, or about 25° or less, or about 20° or less, or about 15° or less, or about 10° or less, or about 5° or less, or about 4° or less, or about 3° or less, or about 2° or less, or about 1° or less or about 0°. As such, the plurality of reclaim ports 68 generally suck or draw gases in the reclaim chamber 64 in a radial direction. FIGS. 6A and 6B depict a radial velocity distribution for four reclaim ports 68 tangentially coupled or oriented to the exterior surface 60C of the housing 60. The orientation of the four reclaim ports produce an improved velocity uniformity at the center fiber region, thereby decreasing fiber vibration. It will be understood that different reclaim ports 68 may form different angles with the exterior housing 60 than other reclaim ports 68. For example, one or more reclaim ports 68 may form a first angle (e.g., 20°) with the housing 60 and one or more reclaim ports 68 may form a second angle (e.g., 0°) with the housing 60. In examples of the reclaim cylinder 26 where a plurality of reclaim ports 68 are utilized, the reclaim ports 68 may be spread around a circumference or perimeter of the housing 60 and/or may be grouped. For example, the reclaim cylinder 26 may have groupings of the reclaim ports 68 positioned around the circumference or perimeter of the housing 60.

The reclaim ports 68 may be positioned at a variety of positions along the length of the housing 60. For example, one or more of the reclaim ports 68 may be positioned at a bottom, middle or top of the reclaim cylinder 26. According to various examples, the reclaim ports 68 are positioned proximate the second end 60B of the reclaim chamber 26. In other words, the reclaim ports 68 are closer to the second end 60B of the housing 60 than the first end 60A of the housing 60.

According to various examples, the gas sampling port 52 and the particle sampling port 54 are perpendicularly coupled or oriented to the exterior surface 60C of the housing 60. For purposes of this disclosure, the term "perpendicularly coupled" means that a centerline of each of the gas sampling port 52 and the particle sampling port 54 intersect the exterior surface 60C and/or interior surface 60D of the housing 60 at an angle of 90°. The gas sampling port 52 and the particle sampling port 54 may be positioned at a variety of positions along the length of the housing 60. For example, one or more of the reclaim ports 68 may be positioned at a bottom, middle or top of the reclaim cylinder 26. According to various examples, the gas sampling port 52 and the particle sampling port 54 are positioned proximate the first end 60B of the reclaim chamber 26. In other words, the gas sampling port 52 and the particle sampling port 54 are closer to the first end 60A of the housing 60 than the second end 60B of the housing 60. In some embodiments, the gas sampling port 52 and the particle sampling port 54 are positioned along the length of the housing 60 at the same height relative to each other. In some embodiments, the gas sampling port 52 and the particle sampling port 54 are positioned along the length of the housing 60 at 90 degree offset from each other.

Figure 7:
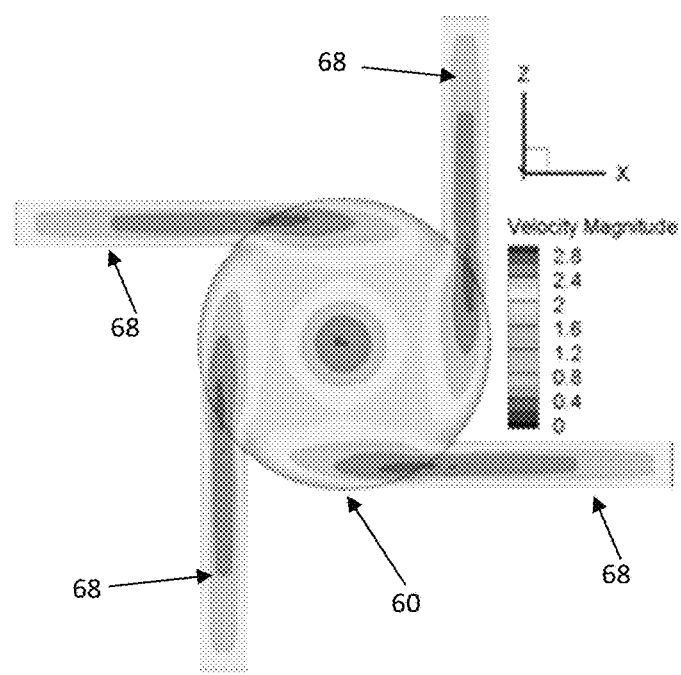
FIG. 7 is a radial velocity distribution of a purge cycle of a reclaim cylinder, according to one embodiment.

The capture stream drawn in by the reclaim ports 68 may have a flow rate of from about 10 SLPM to about 40 SLPM, or from about 15 SLPM and about 35 SLPM, or from about 20 SLPM and about 30 SLPM. In some examples, the reclaim ports 68 may draw a capture stream having a flow rate of about 29 SLPM, or about 30 SLPM, or about 31 SLPM or about 32 SLPM. According to various examples, one or more of the reclaim ports 68, the gas sampling port 52, and/or the particle sampling port 54 may be equipped with a gas purge device. Such a gas purge device may be configured to pass an inert gas in a reverse manner (e.g., toward the reclaim cylinder 26) through the reclaim ports 68 to clear any particles which may become lodged within and/or partially block the reclaim ports 68 and to clean deposit particles along the inner lower extended muffle wall. FIG. 7 shows velocity distribution comparison of a four ports tangentially oriented to the housing 60. The tangential layout has a higher vortex velocity which help to blow away deposited particles on the inner wall of the lower extended muffle at idle fiber status.

As the plurality of reclaim ports 68 are generally tangentially coupled or oriented with respect to the housing 60, as the first gas is drawn into the reclaim ports 68 a vortex of the first gas is generated within the reclaim chamber 64. For purposes of this disclosure, the term "vortex" generally means that the gas within the reclaim chamber 64 has a generally circular motion and that the gas has an angular velocity. According to various examples, an axis of rotation of the vortex may be substantially parallel with an axis of the reclaim cylinder 26. In other words, the gases of the vortex may generally move in a circular path around the reclaim chamber 64 with the center of the circular path being generally along the axis of the reclaim cylinder 26. As will be understood, the direction and/or speed of the vortex of the first and second gas within the reclaim chamber 64 may be adjusted by the orientation of the reclaim ports 68 as well as the speed which the gases are drawn from the fiber draw furnace 10. As will be explained in greater detail below, the generation of the vortex of gases within the reclaim chamber 64 may aid in the collection and removal of particulate matter which may otherwise agglomerate and form larger particles in the lower extended muffle 30 and aid in the formation of DIPDs. In addition, the capture stream of gases may be reclaimed, cooled and/or purified for later reuse within the fiber draw furnace 10.

In operation, the fiber draw furnace 10 may allow for both the reclamation of the first gas while also removing particulates generated within the heated section 22. Further, as the second gas may flow from the lower extended muffle 30 into the reclaim cylinder 26, a portion of the second gas may be removed and/or reclaimed. Even further, not all of the first gas may be removed by the one or more reclaim ports 68 such that a portion of the first gas may pass from the reclaim cylinder 26 into the lower extended muffle 30.

As explained above, due to the inertia of larger size particles, the larger particles generated within the heated section 22 may continue through the housing 60 and into the lower extended muffle 30. In other words, the larger particles may follow the path of the optical fiber 46 through the reclaim cylinder 26 and through the lower extended muffle 30. Conversely, the smaller particles, having less inertia, are more subject to the flow of the first and/or second gases. As such, the smaller particles may be captured within the vortex of gases created by the tangential coupling of the plurality of reclaim ports 68 to the housing 60. With the smaller particles entrained within the vortex, the reclaim ports 68 may then remove the particles from the fiber draw furnace 10 along with the first and/or second gases.

As the reclaim cylinder 26 is located closer to the upper gas inlet 14, the concentration, or volume fraction, of the first gas may be greater than the concentration of the second gas within the capture stream drawn off by the reclaim ports 68. For example, the volume fraction (i.e., provided as a percentage) of the first gas within the capture stream may be greater than about 70%, or greater than about 75%, or greater than about 80%, or greater than about 85%, or greater than about 90%, or greater than about 95% or greater than about 99%. The reclaim ports 68 may draw the capture stream at a rate such that the mixed gases are captured at a rate greater than about 50% of the combined first and second gas flow rates. For example, the flow rate of the capture stream from the reclaim ports 68 may be about 50% or greater, or about 55% or greater, or about 60% or greater, or about 65% or greater, or about 70% or greater, or about 75% or greater, or about 80% or greater, or about 85% or greater, or about 90% or greater, or about 95% or greater or about 99% or greater of the combined first gas and second gas flow rates.

Figure 3:
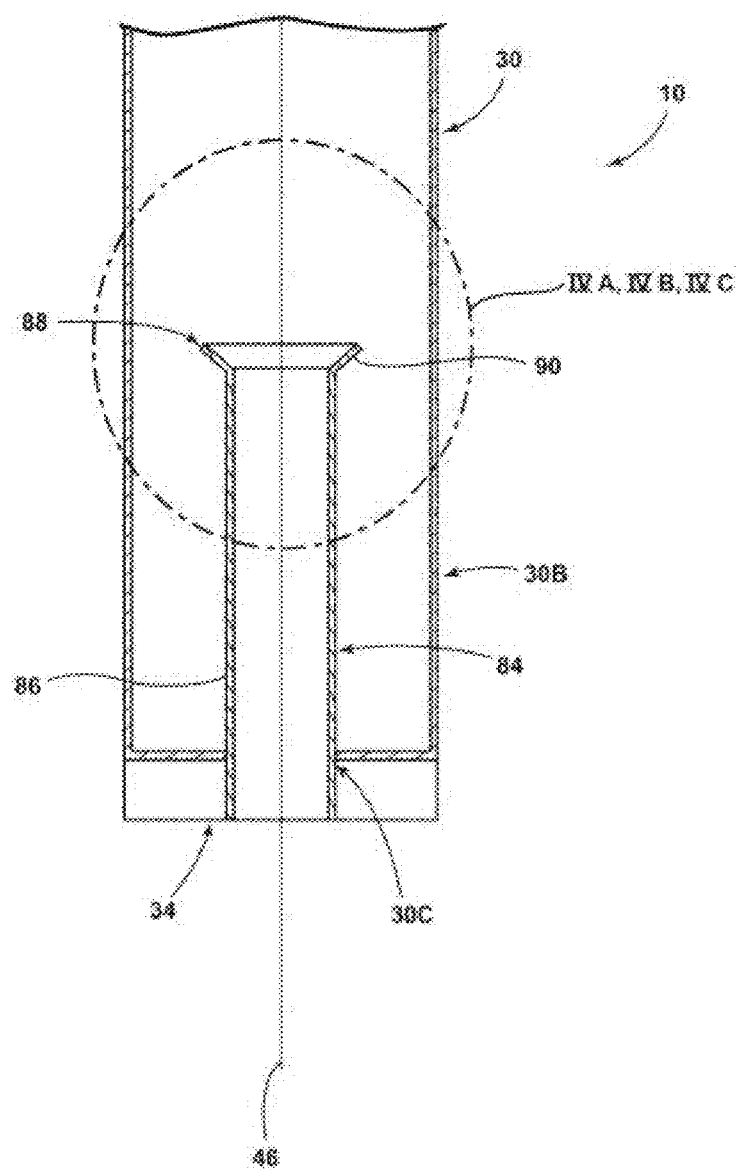
FIG. 3 is an enhanced view taken at section III of FIG. 1, according to one embodiment.
Figure 4A:
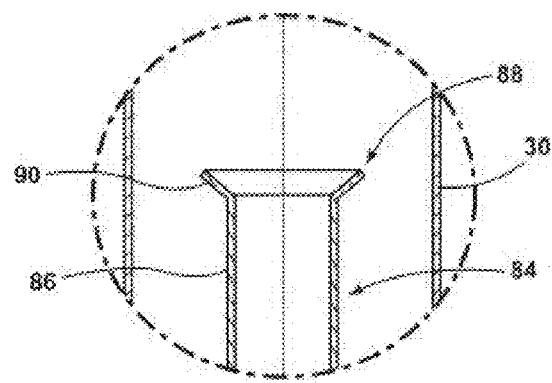
FIG. 4A is an enhanced view taken at section IVA of FIG. 3, according to another embodiment.
Figure 4B:
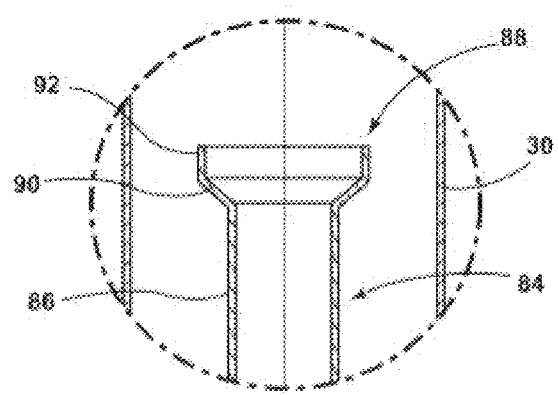
FIG. 4B is an enhanced view taken at section IVB of FIG. 3, according to another embodiment.
Figure 4C:
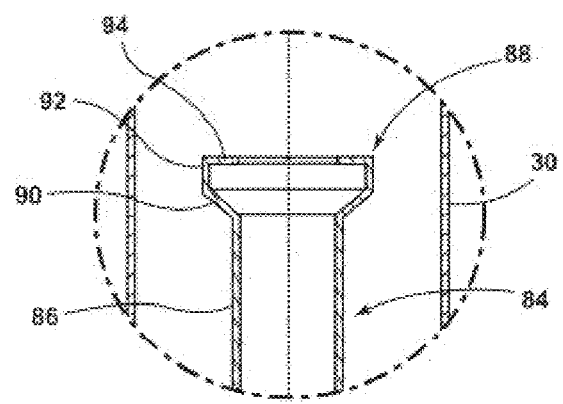
FIG. 4C is an enhanced view taken at section IVC of FIG. 3, according to another embodiment.

Referring now to FIGS. 3-4C, the lower extended muffle 30 is shown including an tube 84. It will be understood that use of the tube 84 may be optional and that not all of the examples provided herein may include the tube 84. The tube 84 may be coupled to the outlet 30C of the lower extended muffle 30 and/or may be coupled to the bottom gas inlet 34. In operation, the optical fiber 46 is drawn through reclaim cylinder 26, into the lower extended muffle 30, through the tube 84 and out of the fiber draw furnace 10 through the bottom gas inlet 34. The tube 84 extends in an upward direction from the second end 30B toward the first end 30A of the lower extended muffle 30. The tube 84 includes a body 86 and an entrance 88. The body 86 may be substantially coaxial with the lower extended muffle 30 and/or the reclaim cylinder 26. The body 86 of the tube 84 may have an inside diameter of from about 0.25 in (0.635 cm) to about 2.0 in (5.08 cm), or from about 0.5 in (1.27 cm) to about 1.0 in (2.54 cm). In specific examples, the inside diameter of the tube 84 may be about 0.5 in (1.27 cm), about 0.75 in (1.905 cm), about 1.0 in (2.54 cm), or about 1.25 in (3.175 cm). The tube 84 may have a length of from about 1 in (2.54 cm) to about 10 in (25.4 cm), or from about 2 in (5.08 cm) to about 7 in (17.78 cm). In specific examples, the tube 84 may have a length of about 3 in (7.62 cm), about 4 in (10.16 cm), about 5 in (12.7 cm) or about 6 in (15.24 cm).

Alteration of the entrance 88 of the tube 84 may decrease or mitigate the number and/or frequency of DIPDSs. FIGS. 4A-C provide various examples of the entrance 88 of the tube 84. The entrance 88 of the tube 84 may take a variety of configurations. In various examples, the entrance 88 may include a conical portion 90. The conical portion 90 may be inverted such that the entrance 88 of the tube 84 tapers as it approaches the body 86. Use of the conical portion 90 may be advantageous in reducing the DIPDs by reducing a magnitude of a radial component of the first and/or second gas velocity vector and therefore reduces flow of the first or second gases toward the muffle 42 (FIG. 1) of the heated section 22 thereby reducing particles entering the lower extended muffle 30 and being recirculated. In a first example (FIG. 4A), the entrance 88 may simply include the conical portion 90 tapering toward the body 86 of the tube 84. In a second example (FIG. 4B), the entrance 88 may incorporate a first flange 92 which is substantially coaxial with the tube 84. The first flange 92 may be placed on top of the conical portion 90 such that the entrance 88 tapers from the first flange 92 to the body 86. In a third example (FIG. 4C), a second flange 94 may be positioned on top of the first flange 92, the second flange 94 being perpendicular to the body 86 of the tube 84 and the first flange 92. The second flange 96 may extend inward and/or outward from the tube 84. Use of the examples depicted in FIGS. 4A-C may decrease the DIPDs per kilometer of produced optical fiber 46 from about 5% in examples with no entrance 88 (e.g., just the body 86 of the tube 84) to less than about 1.5% in examples using at least the conical portion 90.

Figure 5:
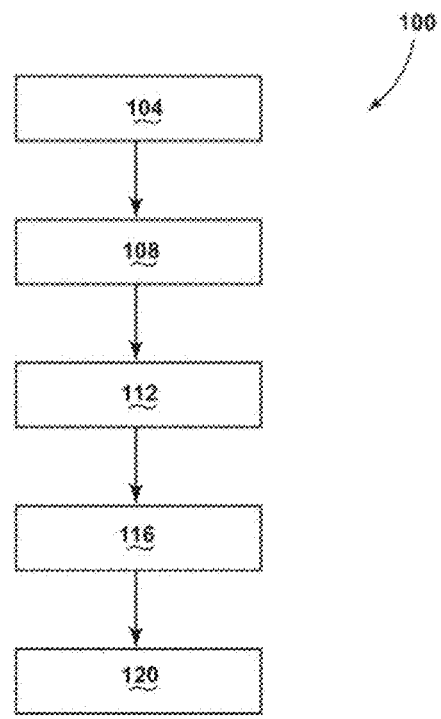
FIG. 5 is a flow diagram of an exemplary method, according to one embodiment.

Referring now to FIG. 5, depicted is an exemplary method 100 of producing the optical fiber 46. The method 100 may begin with step 104 of flowing the first gas into the optical fiber draw furnace 10. As explained above, the first gas may be flown into the fiber draw furnace 10 through the upper gas inlet 14. As the first gas may be a gas which is inert to the muffle 42, optical fiber preform 38 and/or other components of the fiber draw furnace 10, step 104 may further include flowing helium into the optical fiber draw furnace 10. It will be understood that any of the above noted first gases may additionally or alternatively flown into the fiber draw furnace 10.

Next, a step 108 of passing the first gas through the heated section 22 configured to contain and heat a glass source from which the optical fiber 46 is drawn is performed. The glass source may be the optical fiber preform 38 or other glass sources which may be utilized in the fiber draw furnace 10. As explained above, the high temperatures of the heated section 22 may result in the formation of particles which are entrained within the first gas as it passes through the heated section 22 and/or proximate the muffle 42.

Next, a step 112 of passing the first gas into the reclaim cylinder 26 is performed. As explained above, the reclaim cylinder 26 may be coupled to the heated section 22 through the top flange 76. It will be understood that one or more sections of pipe or tubing may be positioned between the reclaim cylinder 26 and the heated section 22 without departing from the teachings provided herein. The first gas is passed into the reclaim chamber 64 defined by the housing 60 of the reclaim cylinder 26. As explained above, as the reclaim chamber 64 has a greater diameter than the heated section 22, the velocity of the first gas may be slowed relative to the gas velocity of the first gas in the heated section 22.

Next, a step 116 of removing a portion of the first gas through at least one reclaim port 68 coupled with the reclaim cylinder 26 such that a vortex of the first gas is generated in the reclaim cylinder 26 is performed. The one or more reclaim ports 68 are tangentially oriented or coupled to the housing 60 of the reclaim cylinder 26 such that gases within the reclaim chamber 64 obtain an angular momentum. In other words, the vortex is generated within the reclaim chamber 64. As explained above, by removing the portion of the first gas through the tangentially oriented at least one reclaim port 68, the axis of rotation of the vortex is parallel with an axis of the reclaim cylinder 26. As the reclaim cylinder 26, the lower extended muffle 30 and the heated section 22 are all aligned, the axis of rotation of the vortex may be parallel with an axis of the lower extended muffle 30 and/or the heated section 22. According to various examples, a portion of the second gas may flow upward through the lower extended muffle 30 and into the reclaim chamber 64 of the reclaim cylinder 26 such that both the first and second gases form the vortex. As such, the one or more reclaim ports 68 may reclaim or remove a mixture of the first gas and second gas. The first and second gases may be reclaimed at a rate of from about 80% to about 95% of the combined first and second gas flow rate and the first gas volume fraction in the mixture gas is about 80% or greater. It will be understood that a portion of the first gas may not be captured by the reclaim ports 68 such that the reclaim cylinder 26 may pass a portion of the first gas from the reclaim cylinder 26 into the lower extended muffle 30.

Next, a step 120 of flowing the second gas from a gas inlet (e.g., the bottom gas inlet 34) at a rate configured to substantially recover a pressure drop associated with removing the portion of the first gas may be performed. As explained above, removal of the first and/or second gases by the reclaim ports 68 may result in a pressure drop occurring within the fiber draw furnace 10 which may result in the entraining of ambient air within the fiber draw furnace 10. Step 120 may include flowing a gas which is inert to the optical fiber from the bottom gas inlet 34.

It will be understood that although the steps of the method 100 are described in a sequential order, one or more of the steps may be performed at the same time. For example, all of the steps may be performed simultaneously. Further, it will be understood that the order of the steps of the method 100 may be changed without departing from the teachings provided herein.

Use of the present disclosure may offer a variety of advantages. First, by positioning the reclaim cylinder 26 between the heated section 22 and the lower extended muffle 30, a higher purity of the first gas may be reclaimed through the reclaim ports 68. In other words, the capture stream pulled through the reclaim ports 68 may have a larger volume fraction of the first gas than the second gas. Such a feature may be advantageous in decreasing costs associated with the use of helium as the reclaim cylinder 26 of the present disclosure may allow for a greater efficiency of capture as compared to conventional fiber draw furnaces. Second, by tangentially coupling or orienting the reclaim ports 68 relative to the housing 60 of the reclaim cylinder 26, gases present within the reclaim chamber 64 may obtain an angular momentum resulting in the formation of a vortex within the reclaim cylinder 26. As explained above, the formation of the vortex is advantageous in capturing relatively small particles which may otherwise agglomerate on walls of the lower extended muffle 30 and form DIPDS on the optical fiber 46. As such a greater usable length of optical fiber 46 may be produced from the presently disclosed fiber draw furnace 10 which results in decreased costs associated with the production of unusable lengths of optical fiber 46.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below.

What is claimed is:

1. A reclaim cylinder, comprising:
   a housing comprising a first end and a second end and defining a reclaim chamber;
   a plurality of gas reclaim ports spaced equidistant from each other and tangentially coupled to the housing such that a centerline of each gas reclaim port intersects an exterior surface of the housing at an angle of about 45 degrees or less;
a gas sampling port perpendicularly coupled to the housing such that a centerline of the gas sampling port intersects the exterior surface of the housing at an angle of about 90 degrees; and
a particle sampling port perpendicularly coupled to the housing such that a centerline of the particle sampling port intersects the exterior surface of the housing at an angle of about 90 degrees;
wherein the reclaim cylinder is configured to be coupled to a fiber draw furnace system; and
wherein a cross-sectional area of a gas flow passage within the reclaim cylinder is uniform along a length of the housing defined by the first end and the second end.

2. The reclaim cylinder of claim 1, wherein the fiber draw furnace system comprises:
a heated section having a first end and a second end, wherein the heated section is configured to hold an optical fiber preform;
an upper gas inlet coupled to the first end of the heated section, wherein the upper gas inlet is configured to flow a first gas into the heated section;
a lower extended muffle having a first end and a second end; and
a lower gas inlet coupled to the second end of the lower extended muffle and configured to flow a second gas into the lower extended muffle,
wherein the reclaim cylinder is configured to be coupled to the lower extended muffle between the first end of the lower extended muffle and the second end of the heated section.

3. The reclaim cylinder of claim 2, wherein the first end of the housing is configured to be coupled to the heated section and the second end of the housing is configured to be coupled to the first end of the lower extended muffle.

4. The reclaim cylinder of claim 3, wherein the plurality of gas reclaim ports are closer to the second end of the housing than the first end of the housing.

5. The reclaim cylinder of claim 3, wherein the gas sampling port and the particle sampling port are closer to the first end of the housing than the second end of the housing.

6. The reclaim cylinder of claim 1, wherein the gas sampling port and the particle sampling port are positioned along the length of the housing at the same height relative to each other.

7. The reclaim cylinder of claim 1, wherein the gas sampling port and the particle sampling port are positioned along the length of the housing at a 90 degree offset from each other.

8. The reclaim cylinder of claim 1, wherein an internal diameter of the housing is about 4.2 cm to about 7.8 cm.

9. The reclaim cylinder of claim 1, wherein an external diameter of the housing is about 4.4 cm to about 7.8 cm.

10. The reclaim cylinder of claim 1, wherein the plurality of gas reclaim ports are configured to generate a gas vortex within the reclaim chamber.

11. The reclaim cylinder of claim 1, wherein the plurality of gas reclaim ports are configured to remove a portion of a gas from the reclaim chamber.

12. A fiber draw furnace system comprising:
a heated section having a first end and a second end, wherein the heated section is configured to hold an optical fiber preform;
an upper gas inlet coupled to the first end of the heated section, wherein the upper gas inlet is configured to flow a first gas into the heated section;
a lower extended muffle having a first end and a second end;
a lower gas inlet coupled to the second end of the lower extended muffle and configured to flow a second gas into the lower extended muffle; and
a reclaim cylinder coupled to the lower extended muffle between the first end of the lower extended muffle and the second end of the heated section, the reclaim cylinder comprising:
a housing comprising a first end and a second end and defining a reclaim chamber;
a plurality of gas reclaim ports spaced equidistant from each other and tangentially coupled to the housing such that a centerline of each gas reclaim port intersects an exterior surface of the housing at an angle of about 45 degrees or less;
a gas sampling port perpendicularly coupled to the housing such that a centerline of the gas sampling port intersects the exterior surface of the housing at an angle of about 90 degrees; and
a particle sampling port perpendicularly coupled to the housing such that a centerline of the particle sampling port intersects the exterior surface of the housing at an angle of about 90 degrees;
wherein a gas flow passage within the reclaim chamber is uniform between the first end and the second end of the housing.

13. The fiber draw furnace system of claim 12, further comprising: a tube extending from the second end of the lower extended muffle toward the first end of the lower extended muffle and that is substantially coaxial with the lower extended muffle.

14. The fiber draw furnace system of claim 13, wherein the tube extends from a lower extended muffle outlet.

15. The fiber draw furnace system of claim 12, wherein the lower gas inlet is configured to flow the second gas into the lower extended muffle at a rate configured to substantially recover a pressure drop associated with removing at least a portion of the first gas from the reclaim chamber.

16. A fiber draw furnace system, comprising:
a reclaim cylinder, comprising:
a housing comprising a first end and a second end and defining a reclaim chamber;
a plurality of gas reclaim ports tangentially coupled to the housing; and
at least one sampling port coupled to the housing;
wherein the plurality of gas reclaim ports and the at least one sampling port are positioned at different heights along a length of the housing defined by the first end and the second end of the housing; and
wherein a cross-sectional area of a gas flow passage within the reclaim cylinder is uniform along a length of the housing defined by the first end and the second end.

17. The fiber draw furnace system of claim 16, wherein a volume of the reclaim chamber is cylindrical.

* * * * *